(12) United States Patent
Grogg et al.

(10) Patent No.: US 8,550,952 B2
(45) Date of Patent: Oct. 8, 2013

(54) SELF-CONTAINED HYDRAULIC TORQUE MODULATING DEVICE

(75) Inventors: John A. Grogg, Laotto, IN (US); Matthew G. Fox, Ceresco, MI (US)

(73) Assignee: Eaton Corporation, Cleveland, OH (US)

( * ) Notice: Subject to any disclaimer, the term of this patent is extended or adjusted under 35 U.S.C. 154(b) by 172 days.

(21) Appl. No.: 13/019,006

(22) Filed: Feb. 1, 2011

(65) Prior Publication Data

US 2011/0190088 A1 Aug. 4, 2011

Related U.S. Application Data

(60) Provisional application No. 61/300,564, filed on Feb. 2, 2010.

(51) Int. Cl.
*F16H 48/20* (2012.01)
(52) U.S. Cl.
USPC .......................................................... 475/231
(58) Field of Classification Search
None
See application file for complete search history.

(56) References Cited

U.S. PATENT DOCUMENTS

| | | | |
|---|---|---|---|
| 4,679,463 A * | 7/1987 | Ozaki et al. ...................... 475/86 |
| 4,966,270 A | 10/1990 | Rispeter et al. |
| 5,069,305 A | 12/1991 | Kobayashi |
| 5,295,921 A * | 3/1994 | Ippolito et al. ................. 475/238 |
| 5,582,557 A * | 12/1996 | Dissett et al. .................. 475/231 |
| 6,076,646 A | 6/2000 | Burns |
| 6,161,643 A | 12/2000 | Bober et al. |
| 6,536,560 B1 | 3/2003 | DeWald |
| 7,051,857 B2 * | 5/2006 | Babin ......................... 192/103 F |
| 7,318,511 B2 * | 1/2008 | Grogg ......................... 192/85.02 |
| 8,104,375 B2 * | 1/2012 | Kassler ........................... 74/640 |
| 2005/0026732 A1 * | 2/2005 | Krisher et al. ................... 475/86 |
| 2006/0289268 A1 | 12/2006 | Grogg |
| 2008/0103009 A1 | 5/2008 | Park |
| 2008/0230295 A1 * | 9/2008 | Grogg ........................... 180/248 |
| 2011/0127135 A1 * | 6/2011 | Grogg et al. ................... 192/48.1 |

OTHER PUBLICATIONS

International Search Report issued in corresponding International (PCT) Patent Application No. PCT/US2011/023361 (Apr. 27, 2011).
Written Opinion issued in corresponding International (PCT) Patent Application No. PCT/US2011/023361 (Apr. 27, 2011).

* cited by examiner

*Primary Examiner* — Dirk Wright
(74) *Attorney, Agent, or Firm* — Dykema Gossett PLLC

(57) ABSTRACT

A torque modulating coupling device for operatively linking two shafts has a clutch and a piston disposed in a case. The piston selectively applies force to the clutch in response to hydraulic pressure, and a keyed feature adapted to couple with a corresponding keyed feature associated with at least one of the shafts. The coupling device can be formed with two cases that form an enclosure for the clutch and the piston, trapping the piston forces between the cases. This embodiment allows the device to also act as an axle housing cover. In another embodiment, the case is designed to bolt directly to an axle housing cover, trapping piston forces between the case and the cover.

20 Claims, 1 Drawing Sheet

SELF-CONTAINED HYDRAULIC TORQUE MODULATING DEVICE

TECHNICAL FIELD

The present invention relates to clutch units, and more particularly to a self-contained clutch device that can be attached between two axle shafts.

BACKGROUND ART

Clutch devices are often used to modulate torque between two shafts, such as two axle shafts in a vehicle. To engage the clutch, hydraulic pressure is applied to a piston in the device, which in turn applies pressure to the clutch to allow torque transfer between the two shafts. Because the hydraulic forces applied to the clutch are quite large, the axle housing, axle bearings, and other gear drive interfaces tend to have complex configurations to accommodate these forces. This complexity may also add to the size of the unit, which is undesirable given the trend toward smaller units with greater functionality.

There is a desire for a clutch unit with a compact structure that is also self-contained to simplify the overall design of the gear drive.

SUMMARY OF THE INVENTION

One embodiment of the invention is a torque modulating coupling device having a case and a clutch and a piston disposed in the case. The coupling device operatively links a first shaft and a second shaft in an axle system. The piston selectively applies force to the clutch in response to hydraulic pressure to engage the clutch. The device also includes a keyed feature adapted to couple with a corresponding keyed feature associated with at least one of the shafts in the system when the clutch engages.

The coupling device may be formed with two cases that form an enclosure for the clutch and the piston, trapping the piston forces between the cases. The two-case embodiment allows the device to also act as an axle housing cover, allowing the axle system to have a smaller profile. In another embodiment, the device is formed with a single case designed to bolt directly to an axle housing cover, trapping piston forces between the case and the cover.

DETAILED DESCRIPTION OF THE EMBODIMENTS

Figure 1:
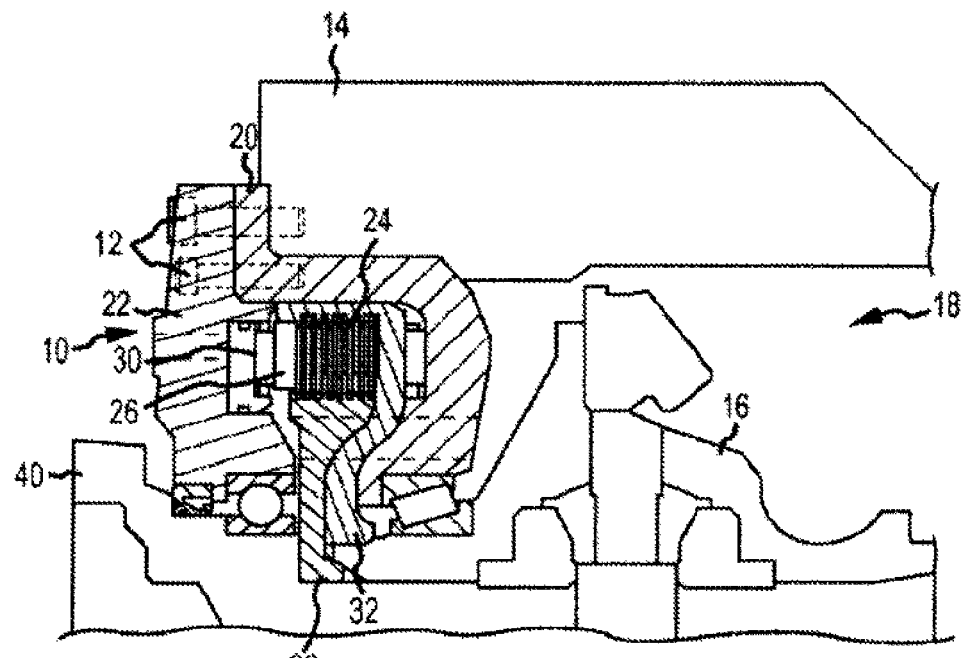
FIG. 1 is a cross-sectional view of a torque modulating device according to one embodiment of the invention.

FIG. 1 is a cross sectional view of a torque modulating coupling device 10 according to one embodiment of the invention. The coupling device 10 may be attached with a bolt 12 or other fastener to an axle housing 14 and a differential 16 disposed in a bore 18 of the axle housing 14. Note that the coupling device 10 can be attached between other structures in a drive system, such as an output shaft, a second axle shaft, two axle housings, etc. instead of between an axle housing 14 and a differential 16 without departing from the scope of the invention.

In the embodiment shown in FIG. 1, the coupling device 10 includes a first case 20 and a second case 22. The first and second cases 20, 22 together form an enclosure for components in the device 10. The components, which will be described in greater detail below, may include a clutch 24 and a piston 26 that selectively applies force to the clutch 24.

To facilitate attachment, the coupling device 10 may include one or more keyed features that engage with corresponding keyed features on the structure(s) that the coupling device 10 is attached to. In the example shown in FIG. 1, the keyed features on the coupling device 10 include an outer diameter spline coupling 32 that engages with an outer spline portion of the differential 16 and an inner spline coupling 36 that engages with a spline portion of an output shaft 40. The spline couplings 32, 36 in this embodiment are formed as part of the clutch 24. Of course, if the coupling device 10 is to be connected to a structure other than a differential 16, the keyed features may be modified and/or be incorporated in another part of the coupling device 10 to engage securely with corresponding keyed features of the other structure.

As a result, the coupling device 10 is self-contained and can be easily bolted on to a drive system without requiring complex modifications of any of the drive system components. Instead, the coupling device 10 itself, and particularly any keyed features that provide an engagement function similar to the spline couplings 32, 36, may be easily modified to accommodate the specific drive configuration that the coupling device 10 will be attached to. Also, the forces applied by the piston 26 are captured between the first and second cases 20, 22. As noted above, the piston 26 can generate massive forces, and if these forces are not contained, the size and cost of other components in the system, such as the axle bearings, may increase to accommodate these forces. By keeping the forces from the piston 26 contained in the cases 20, 22, the coupling device 10 can accommodate these large forces without requiring any changes to components outside the coupling device 10.

The coupling device 10 shown in FIG. 1 makes the overall system more compact because it acts as part of the axle housing 14 and also supports a bearing in the differential 16. If a customer wished to offer the system without the coupling device 10, it would need to replace the coupling device 10 with a solid cover to support the differential. Thus, integrating the coupling device 10 with the axle housing 14 as shown in FIG. 1 allows the coupling device 10 to act as a cover as well, providing multiple functions in a compact design.

During operation, hydraulic pressure is applied to the piston 26 by routing hydraulic fluid into the coupling device 10, which applies a force to a ring 30 that in turn applies a force to the piston 26. The piston 26 applies a force to the clutch 24, which engages the keyed features (e.g., the spline couplings 32, 36 with the corresponding keyed features in the differential 16 and output shaft 40) to couple the coupling device 10 to the differential 16. This engagement and the force from the clutch 24 generate a torque linking the differential 16 with the output shaft 40, causing the differential 16 and output shaft 40 to approach the same rotational speed based on the amount of clutch force applied. Note that, as explained above, the coupling device 10 may directly link the differential 16 to an output shaft or other structure without departing from the scope of the invention.

Figure 2:
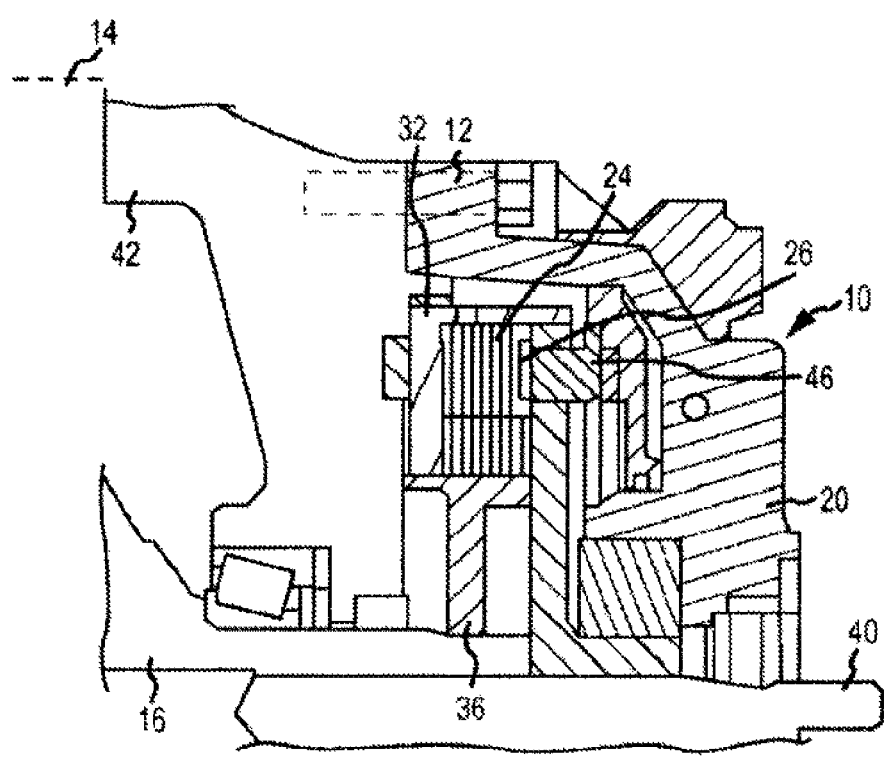
FIG. 2 is a cross-sectional view of a torque modulating device according to another embodiment of the invention.

FIG. 2 illustrates the coupling device 10 according to another embodiment of the invention. This embodiment does not have the second case 22 shown in the previous embodiment, and as a result the components of the coupling device 10 are enclosed between the first case 20 and a solid cover 42 attached to the axle housing 14. The coupling device 10 according to this embodiment is still a complete, self-contained unit and can simply be attached to the cover, 42, axle housing 14 or other drive system component without requiring complex modification of the drive component itself. Unlike the embodiment of FIG. 1, the embodiment of FIG. 2 is bolted onto the cover 42 rather than acting as a cover itself. As a result, this embodiment may result in a less compact profile than the embodiment in FIG. 1. However, it also may allow a customer to offer a system both with and without the coupling device 10 with minimal or no modification of the drive system.

The other components of the coupling device 10 according to this embodiment are similar to those in FIG. 1. The coupling device 10 couples the output shaft 40 to the differential 16 via the outer diameter spline coupling 32, which couples the differential 16 to the plates in the clutch 24, and the inner diameter spline coupling 36, which couples the clutch 24 to a corresponding spline portion that is in turn splined to the output shaft 40.

In this embodiment, hydraulic fluid is routed into the coupling device 10, causing pins 46 (which provide the same function as the ring 30 in the embodiment of FIG. 1) to apply force to the piston 26. The piston 26, in turn, applies force to the clutch 24. In the example shown in FIG. 2, the piston forces are trapped between the axle housing 14 and the first case 20 to push the differential 16 into the cover 42, thereby causing the differential 16 and output shaft to approach the same rotational speed.

While the best modes for carrying out the invention have been described in detail, those familiar with the art to which this invention relates will recognize various alternative designs and embodiments for practicing the invention within the scope of the appended claims.

What is claimed is:

1. A coupling device for modulating torque in a drive system having a first shaft and a second shaft, comprising:
    a case that forms a self-contained enclosure, the enclosure configured to be disposed adjacent an axle housing;
    a clutch disposed in the case;
    a piston disposed in the case, wherein the piston selectively applies force to the clutch in response to hydraulic pressure to engage the clutch, and the piston force is contained within the case;
    a keyed feature adapted to couple the clutch with a corresponding keyed feature associated with at least one of the first shaft and the second shaft.

2. The coupling device of claim 1, wherein the case comprises a first case and a second case, and wherein the first and second cases form the enclosure to enclose the clutch and the piston.

3. The coupling device of claim 2, wherein at least one of the first case and the second case functions as an axle housing cover for the drive system.

4. The coupling device of claim 1, wherein the drive system has an axle housing cover, and wherein the case is configured to attach to the cover to encase the clutch and the piston between the case and the axle housing cover.

5. The coupling device of claim 1, further comprising at least one of a ring and a plurality of pins that are hydraulically actuated to selectively apply force to the piston.

6. The coupling device of claim 1, wherein the keyed feature comprises at least one spline coupling.

7. The coupling device of claim 1, wherein the drive system further comprises a differential, and wherein said keyed feature comprises:
    an outer diameter spline coupling that selectively engages with an outer spline portion of the differential; and
    an inner diameter spline coupling that selectively engages with a spline portion of the first shaft or the second shaft.

8. The coupling device of claim 1, wherein the case rotatably supports a portion of at least one of the first shaft and the second shaft.

9. A drive system, comprising:
    a first shaft and a second shaft;
    a coupling device that modulates torque between the first and second shafts, the coupling device having
        a case that forms a self-contained enclosure, the enclosure configured to be disposed adjacent an axle housing,
        a clutch disposed in the case,
        a piston disposed in the case, wherein the piston selectively applies force to the clutch in response to hydraulic pressure to engage the clutch, and the piston force is contained within the case,
        a keyed feature adapted to couple the clutch with a corresponding keyed feature associated with at least one of the first shaft and the second shaft.

10. The drive system of claim 9, wherein the case comprises a first case and a second case, and wherein the first and second cases form the enclosure to enclose the clutch and the piston.

11. The drive system of claim 10, wherein at least one of the first case and the second case functions as an axle housing cover for the drive system.

12. The drive system of claim 9, further comprising an axle housing cover, and wherein the case is configured to attach to the cover to encase the clutch and the piston between the case and the axle housing cover.

13. The drive system of claim 9, wherein the coupling device further includes at least one of a ring and a plurality of pins that are hydraulically actuated to selectively apply force to the piston.

14. The drive system of claim 9, wherein the keyed feature in the coupling device comprises at least one spline coupling.

15. The drive system of claim 9, further comprising a differential, and wherein said keyed feature in the coupling device comprises:
    an outer diameter spline coupling that selectively engages with an outer spline portion of the differential; and
    an inner diameter spline coupling that selectively engages with a spline portion of the first shaft or the second shaft.

16. The coupling device of claim 9, wherein the case rotatably supports a portion of at least one of the first shaft and the second shaft.

17. A coupling device for selectively coupling an output shaft with a differential in an axle assembly, the coupling device comprising:
    a case that forms a self-contained enclosure, wherein the case is configured to be secured to a housing of the axle assembly;
    a clutch disposed within the case;
    a piston disposed within the case for selectively applying a force to operate the clutch, wherein the force applied by the piston is contained within the case;
    an outer diameter spline coupling that connects the clutch to the differential; and
    an inner diameter spline coupling that connects the clutch to the output shaft.

18. The coupling device of claim 17, wherein the case comprises a first member and a second member that are secured together to form the self-contained enclosure.

19. The coupling device of claim 18, wherein the case functions as a cover for the axle housing.

20. The coupling device of claim 17, wherein the case rotatably supports a portion of at least one of the differential and the output shaft.

\* \* \* \* \*